United States Patent [19]

Acree et al.

[11] 4,428,108
[45] Jan. 31, 1984

[54] METHOD OF FORMING ENCAPSULATED DEPLETED URANIUM OIL FIELD TUBULAR MEMBER

[75] Inventors: Elick H. Acree, Alvin; Walter P. Peeples, Jr., Houston, both of Tex.

[73] Assignee: Gulf Nuclear, Inc., Webster, Tex.

[21] Appl. No.: 308,580

[22] Filed: Oct. 5, 1981

[51] Int. Cl.³ ............... B21D 39/00; B23P 19/04
[52] U.S. Cl. .................................. 29/455 R; 29/460; 138/114; 138/147; 166/242; 175/320
[58] Field of Search ............. 29/455 R, 460; 138/114, 138/140, 147; 175/320; 166/243, 242

[56] References Cited

U.S. PATENT DOCUMENTS

| | | | |
|---|---|---|---|
| 2,814,462 | 11/1957 | De Jarnett | 255/28 |
| 3,047,313 | 7/1962 | Bruce | 285/47 |
| 3,087,513 | 4/1963 | O'Rourke | 138/114 X |
| 3,167,137 | 1/1965 | Humphrey | 175/320 |
| 3,179,188 | 4/1965 | De Jarnett | 175/320 |
| 3,265,091 | 8/1966 | De Jarnett | 138/114 |
| 3,654,691 | 4/1972 | Willhite et al. | 29/455 R X |
| 4,028,796 | 6/1977 | Bergstrom | 29/455 R X |
| 4,211,440 | 7/1980 | Bergstrom | 138/147 X |

Primary Examiner—Charlie T. Moon

[57] ABSTRACT

The present invention describes an encapsulated depleted uranium metal oil field tubular member. The member includes a tubular shell containing bodies of a depleted uranium metal. Substantially all of the volume within the shell not occupied by the bodies of depleted uranium metal is filled with lead. The ends of the shell are capped and have connected thereto threaded connectors for connecting the member to adjacent components in a string.

2 Claims, 8 Drawing Figures

METHOD OF FORMING ENCAPSULATED DEPLETED URANIUM OIL FIELD TUBULAR MEMBER

BACKGROUND OF THE INVENTION

A. Field of the Invention

The present invention relates generally to oil field tubular members, and more particularly to an encapsulated depleted uranium weighted sinker bar or drill collar and a method of making same.

B. Description of the Prior Art

Many operations associated with drilling and completing oil and gas wells include the use of weighted tubular members. In drilling, the drill pipe is kept in tension and the weight on bit is provided by thick walled heavy sections of pipe known as drill collars immediately above the bit. In wire line operations, the line and associated tools must be pulled into the hole by weights, which are known as sinker bars.

It is desirable that both sinker bars and drill collars have as great a weight per unit length as possible. During drilling, drill collars are under compression and the longer the string of drill collars, the more subject such string is to deflection. By increasing the weight per unit of length, the string of drill collars can be made shorter and effectively more rigid. Also, a shorter string of drill collars requires fewer connections. By reducing the number of connections, the costs associated with reconditioning the drill collars is reduced.

One attempt to provide a drill collar with increased weight per unit length is disclosed in U.S. Pat. No. 3,167,137. The drill collar of the '137 patent includes inner and outer pipes with tool joints connected to either end to form an annular chamber. The annular chamber is filled with lead or an alloy of lead. Since lead is approximately 40% more dense than steel, the drill collar of the '137 patent has a higher weight per unit length than a steel drill collar of substantially the same diameter.

In U.S. Pat. Nos. 2,814,462, and 3,179,188, there are disclosed fluid packed drill collars. The drill collars of the '462 and '188 patents include generally cylindrical inner and outer pipes with tool joints connected thereto to form an annular chamber which contains a fluid and solid bodies movable with respect to the fluid. In certain embodiments disclosed in the '462 and '188 patents, the fluid is disclosed as being mercury. Since the density of mercury is approximately 68% greater than that of steel, a mercury packed drill collar, as disclosed in the '462 or '188 patents, has a higher weight per unit length than a steel drill collar of the same diameter.

It is important to minimize the length of the sinker bar string used in weighting wire line equipment. There are three types of sinker bars; strap-on; solid; and, contact bars. The strap-on type is flexible and is strapped onto the lowering cable, but is not readily used because it typically is of low mass. Solid bars are mounted on the bottom of the wire line tool string and are typically the heaviest sinker bars. However, the presence of the solid bar at the bottom of the tool string makes it impossible to log to the bottom of the hole. When solid bars are used, it is necessary to drill below the lowest area of interest. Contact bars are mounted on the top of the tool string and have means for establishing electrical contact between the wire line and the logging tool.

Wire line logging equipment are run into pressurized wells through lubricators. A lubricator is essentially a pipe having a stuffing box at the top and a valved connection to the well-head at the bottom. The wire line tools and sinker bars are connected together and loaded into the lubricator. The lubricator valve is then opened and then the tools and sinker bars are run into the wellbore. By increasing the weight per unit length of the sinker bars, the length of the sinker bar string can be reduced, thereby reducing the necessary length of lubricator. Also, as with the case of drill collars, fewer connections are necessary to connect together the sinker bar string, thereby reducing the number of places for equipment to malfunction.

It is therefore an object of the present invention to provide an improved oil field weighted tubular member having a higher weight per unit length than heretofore existing members. It is a further object of the present invention to provide a depleted uranium weighted oil field tubular member that is encapsulated, thereby to prevent hazards due to the pyrophoretic properties of uranium metal. It is yet a further object of the present invention to provide an encapsulated depleted uranium tubular member that will withstand abuse and wellbore pressures without deformation.

SUMMARY OF THE INVENTION

Briefly stated, the foregoing and other objects and advantages of the present invention are accomplished by providing an encapsulated depleted uranium metal oil field tubular member. The member includes a tubular shell containing bodies of depleted uranium metal. Substantially all of the volume within the shell not occupied by the bodies of depleted uranium metal is filled with lead. The ends of the shell are capped and have connected thereto threaded connectors for connecting the member to adjacent components in a string.

The method of forming the tubular member of the present invention includes filling the tubular shell with the bodies of depleted uranium metal with pieces of lead interspersed among the bodies of uranium metal. The filled outer shell is positioned in a generally vertical orientation and a heating zone is created around the tubular shell. The temperature of the heating zone is higher than the melting point of lead, but lower than a temperature that will have deleterious effects upon the mechanical properties of the shell. The heating zone causes the lead to melt, whereupon the bodies of uranium metal sink in the liquid lead, displacing liquid lead upwardly between the tubular shell and the depleted uranium bodies. The melting zone is moved slowly up the length of the shell at a rate sufficient to maintain a substantially continuous zone of contact between melted lead within the zone and solidified lead below the zone, thereby insuring that all voids between the tubular shell and the depleted uranium bodies are substantially completely filled.

DESCRIPTION OF THE PREFERRED EMBODIMENT

Figure 1:
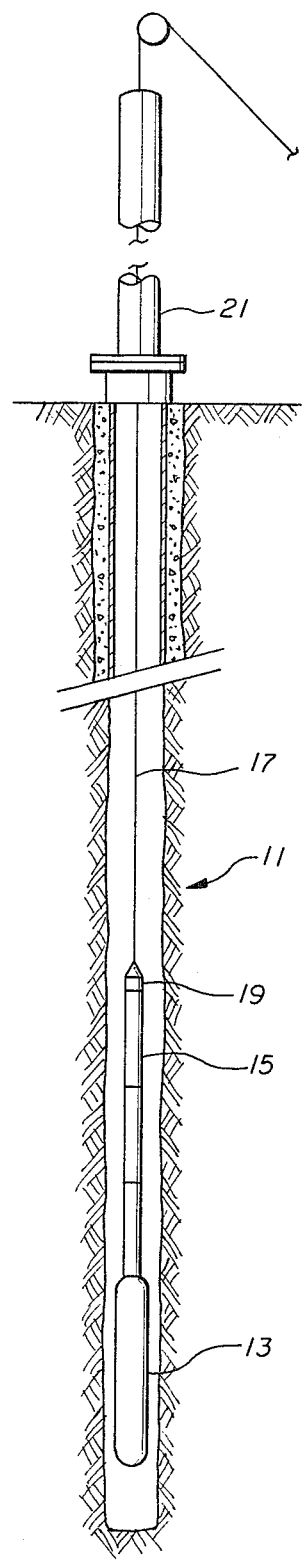
FIG. 1 is a view showing the environment of the sinker bar of the present invention.

Referring now to the drawings, and first to FIG. 1, there is shown a sectional representation of a wellbore 11 during logging operations. A logging tool represented generally by the numeral 13, is shown supported in wellbore 11 by a string of sinker bars, including a sinker bar 15, which in turn is supported by a wireline 17. Connection between wire line 17 and sinker bar 15 is established through a rope socket 19.

Wire line 17 is run into and out of bore hole 11 through a lubricator 21. Lubricator 21 has a stuffing box at its upper end (not shown) and a valve at its lower end (not shown). Wire line 17 is run up and down through the stuffing box of lubricator 21 by a wench (not shown).

The string of sinker bars and logging tool 13 is introduced into wellbore 11 by first inserting it into lubricator 21 with the lubricator valve closed. The lubricator valve is then opened to pressurize the interior of lubricator 21. The length of lubricator 21 between the stuffing box and the valve must be at least as long as the string of sinker bars and logging tool 13. The higher the wellhead pressure, the more weight is necessary in order to pull wire line 17 through the lubricator stuffing box and into wellbore 11. Conventionally, the weight of the sinker bar string is increased by increasing the number of sinker bars in the string. However, increased length of the sinker bar string makes necessary increased lubricator length, which in turn makes some difficult pressure control of the well. The sinker bar of the present invention has a higher weight per unit length than prior sinker bars, thereby making it possible to increase total sinker bar weight without increasing sinker bar length.

Figure 2:
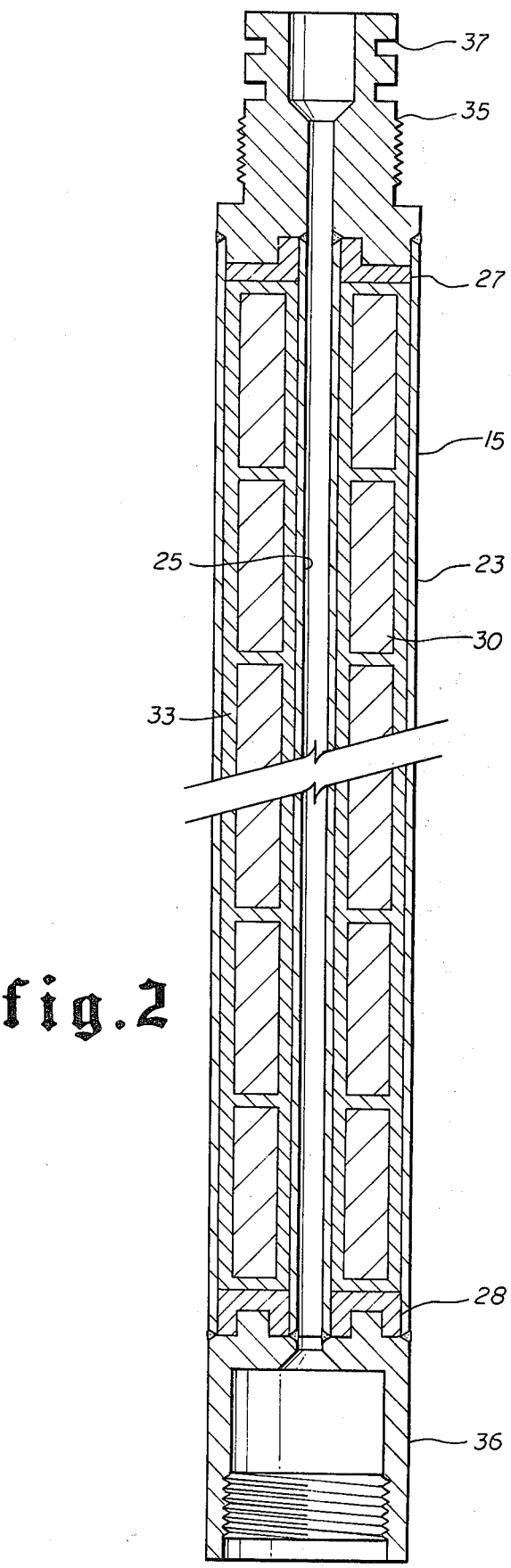
FIG. 2 is a side sectional view of the sinker bar of the present invention.

Referring now to FIG. 2, sinker bar 15 includes a tubular outer shell 23 and an inner shell 25 mounted coaxially within outer shell 23 by a pair of end caps 27 and 28. Outer shell 23 and inner shell 25 between end caps 27 and 28 thus define an annular cavity which contains a plurality of cylinders of weighting material, as for example cylinder 30. In the preferred embodiment, cylinder 30 is pure depleted uranium metal, which is Uranium 238. Depleted uranium is the nonfissionable by-product of the gaseous defusion process for obtaining fissionable enriched uranium. Depleted uranium is an excellent weighting material because it has a density approximately 60% greater than that of lead and more than twice that of most forms of steel. Depleted uranium has a melting point that is somewhat less than that of steel, but substantially higher than temperatures presently encountered in oil and gas drilling and completion. Depleted uranium presents minimal radiation hazards and can be handled with a minimum of precautions. As alternatives to pure depleted uranium, various alloys of uranium may be used. One alternative is ¾% titanium alloy, which has better strength qualities than pure depleted uranium.

In order to maximize the weight per unit length of sinker bar 15, the amount of uranium weighting material therein is maximized by minimizing the thickness of outer shell 23 and inner shell 25. The material and thickness of shells 23 and 25 are chosen such that bar 15 has sufficient tensile strength to support the loads normally encountered in wireline operations, which are usually less than 2000 pounds. In the preferred embodiment, shells 23 and 25 are stainless steel approximately sixty thousands of an inch in thickness.

Because of the relative thinness of the material of shells 25 and 26, it is necessary to fill the space between the uranium bodies and shells 23 and 25 with a compression resistant material 33. Compression resistant material 33 increases the rigidity of sinker bar 15, thereby making it less subject to bending during handling. Additionally, compression resistant material 33 causes sinker bar 15 to be resistant to crushing forces due to pressure within the wellbore.

In the preferred embodiment, the compression resistant material 33 is lead. Lead is a preferable material because it has a melting point higher than temperatures normally encounted in wellbores, but low enough to be worked with safely in the molten state, as will be discussed in greater detail hereinafter, and well below a temperature that will have a deleterious effect upon the material of shells 23 and 25 or uranium metal. Downhole temperatures presently seldom exceed about 260° C. Those skilled in the art will recognize numerous alloys of lead having melting temperature above 260° C.

In order to make sinker bar 15 attachable to axially adjacent members, as for example rope socket 19, logging tool 13, or other sinker bars, threaded end fittings are provided. In the preferred embodiment, the threaded end fittings include a male connector 35 connected by welding or the like to one end of sinker bar 15 and a female connector 36 similarly connected to the other end of sinker bar 15. Male connector 35 preferably includes at least one O-ring groove 37 to seal the interior of the sinker bar string.

Figure 3:
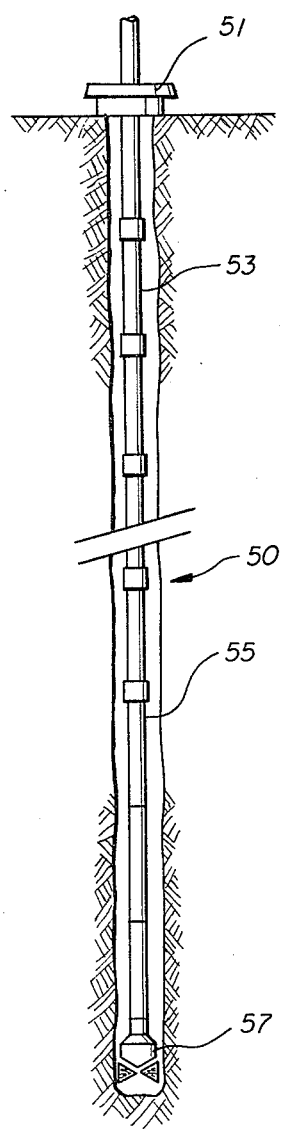
FIG. 3 is a view showing the environment of the drill collar of the present invention.

Referring now to FIG. 3, there is illustrated a wellbore 50 during drilling. A rotary drilling rig is represented schematically by the numeral 51 and is shown supporting a string of drill pipe 53, which in turn supports a string of drill collars, including a drill collar 55, which in turn supports a bit 57. In order to keep the string of drill pipe 53 always under tension, it is necessary that the weight of the drill collars be greater than the maximum weight on bit 57. In the drill collar embodiment of the present invention, the weight per unit length of drill collar is maximized.

Figure 4:
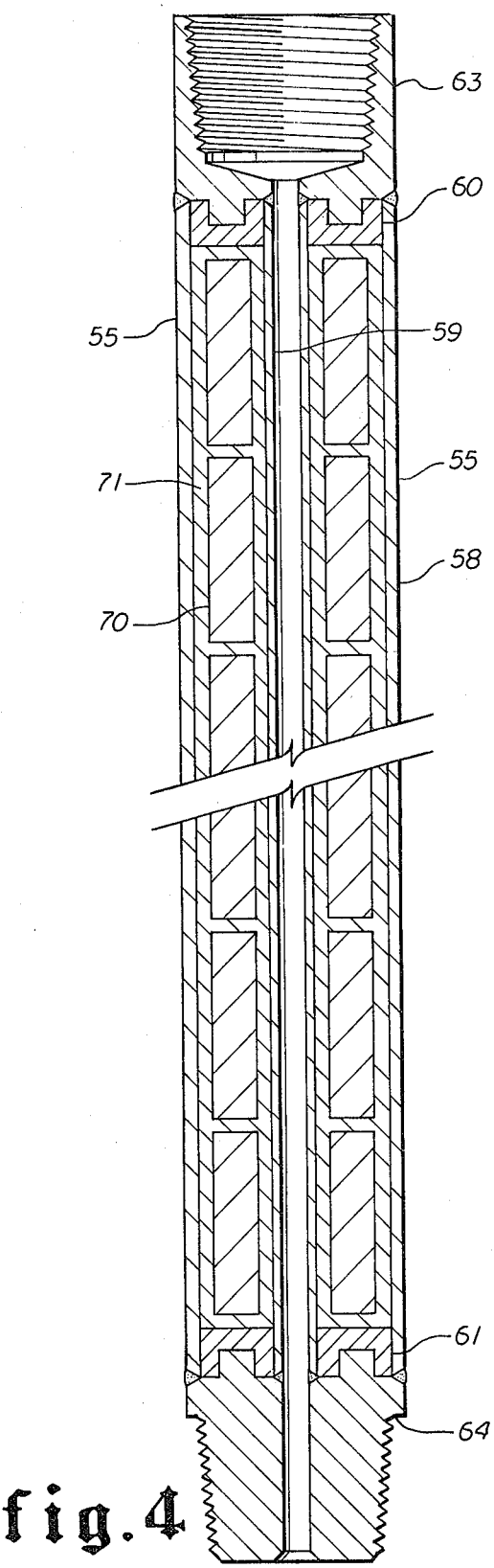
FIG. 4 is a sectional view of the drill collar of the present invention.

Referring now more particularly to FIG. 4, drill collar 55 includes an outer pipe 58 and an inner pipe 59, which is mounted coaxially within outer pipe 58 by a pair of end caps 60 and 61. Drill collar 55 includes a box joint 63 connected by welding or like at one end, and a pin joint 64 similarly connected at the other end.

The space within drill collar 55 between outer pipe 58 and inner pipe 59 is again filled with cylinders of weighting material, as for example cylinder 70 and compression resistant filler material 71. Again, in the preferred embodiment, cylinder 70 is depleted uranium and filler material 71 is lead. It is again desirable to maximize the amount of depleted uranium weighting material within drill collar 55; however, because of the severe conditions within which drill collar 55 is used during drilling, it is necessary that pipes 58 and 59 be stronger than the shells of the sinker bar embodiment of the present invention. In the preferred embodiment of drill collar 55, outer pipe 58 is strong enough to take the torque and compression of drilling.

Lead, particularly in the transition between the solid and liquid phases, has a very high coefficient of thermal expansion. Liquid lead occupies a substantially larger volume than the same mass of solid lead. Accordingly, lead contracts substantially when it is cooled from a liquid state to a solid state. If it were attempted to form the tubular member of the present invention by pouring molten lead into the shells and around the weighting material, it is questionable whether or not the shell could be completed filled with molten lead before it is solidified. If it were possible to so fill the shell with molten lead, then upon cooling and solidifying, the lead would contract to form voids. Similarly, if pieces of lead and weighting material were placed into the shell and then subjected to a temperature above the melting point of lead, upon cooling and solidifying, the lead would contract to form voids.

Figure 5:
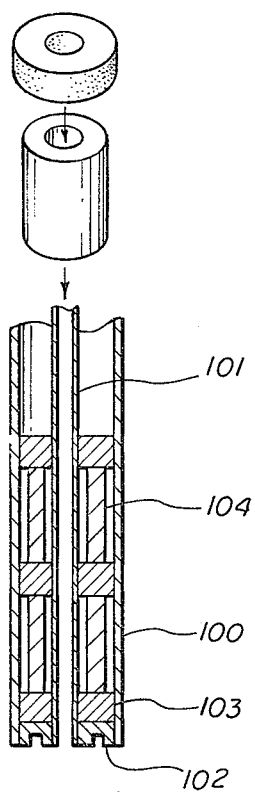
FIG. 5 is a sectional view showing the steps of filling a tubular member according to the method of the present invention.

Referring now to FIGS. 5–8 and first to FIG. 5, there is shown the preferred method of forming the tubular member of the present invention. An outer tubular shell 100 and an inner tubular shell 101 are shown connected by an end cap 102. Cylinders of lead, as for example cylinder 103, and cylinders of depleted uranium, as for example cylinder 104, are loaded into the annular space between outer shell 100 and inner shell 101 in alternating fashion. It is not essential that the cylinders of lead and uranium be alternated precisely as shown in FIG. 5. For example, the space between the shells 100 and 101 may be filled such that a cylinder of lead is interspersed between every two or more cylinders of uranium metal. However, it is necessary that sufficient lead be loaded to fill the expected void volume. Preferably, an excess of lead is loaded.

Figure 6:
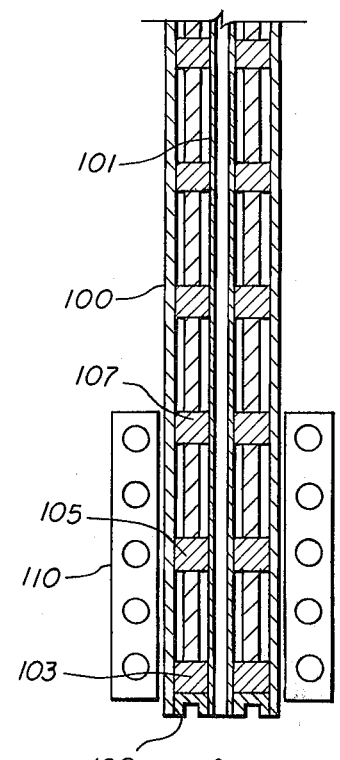
FIG. 6 is a sectional view showing the formation of a heating zone about the tubular member according to the method of the present invention.

Referring now to FIG. 6, a heating zone is formed around the lower end of shell 100 adjacent end cap 102. The heating zone preferably may be formed by an annular heating element, designated by the numeral 110, which is capable of producing temperatures above the melting point of lead, but below a temperature that would melt or would be deleterious to the mechanical properties of shells 100 or 101. In the preferred embodiment, heating element 110 is capable of producing temperatures of approximately 600° C. Heating element 110 defines an axially heating zone which, in the position shown in FIG. 6 contains lead cylinders 103, 105 and 107.

Figure 7:
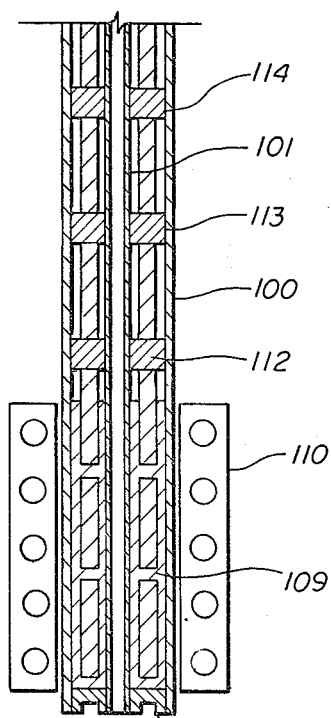
FIG. 7 is a sectional view showing a portion of the melting process of the present invention.

Referring now to FIG. 7, the lead within the heating zone defined by heating element 110 is shown melted into a pool of liquid lead designated by the numeral 109. The cylinders of depleted uranium, being much more dense than the liquid lead of pool 109 sink downwardly and displace melted lead upwardly. The melted lead of pool 109 thus substantially completely fills all of the space between shells 100 and 101 that is not occupied by cylinders of depleted uranium. The cylinders of lead, including cylinders 112, 113, and 114, above the heating zone defined by heating element 110, are blow the melting point of lead, and thus are in the solid state, which is represented in the drawings by the dense crosshatching.

Figure 8:
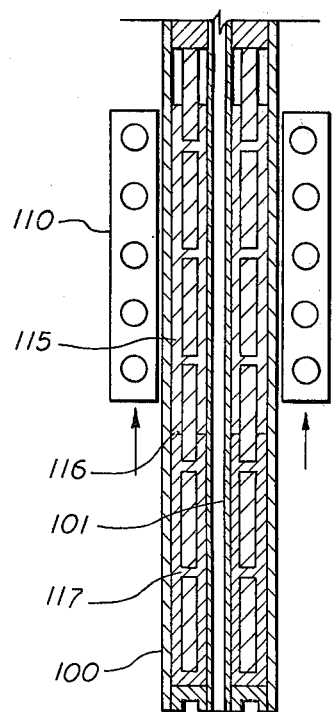
FIG. 8 is a sectional view showing a further portion of the melting process of the present invention.

Referring now to FIG. 8, heating element 110 is shown moved axially upwardly from its position as shown in FIG. 7. The lead cylinders that are designated by the numerals 112, 113, and 114, in FIG. 7, are shown to be melted to form a pool 115 that extends within the zone defined by heating element 110 and for a distance therebelow. The melted lead of pool 115 terminates at a transition zone 116 in which the temperature is equal to or less than the melting point of lead. Below transition zone 116, the lead is solidified to form a solid filler 117. The axial movement of heating element 110 is carefully regulated so as always to maintain a continuous transition zone between melted lead and solidified lead. To complete the encapsulation process, heating element 110 is moved continually axially upwardly about shell 100 until all of the lead cylinders have melted and resolidified.

Upon completion of the encapsulation process, the excess lead that was loaded is removed from the upper end of the space between shells 100 and 101 and an end cap is inserted between shells 100 and 101. In the preferred embodiment, the end cap is machined to form an interference fit with shells 100 and 101. The end cap is then cooled with liquid nitrogen and pressed and welded in place. The end connectors are then welded to the shells to complete the tubular member. In the preferred embodiment, the end connectors are machined and threaded after connection to the ends of the shells.

From the foregoing it will be seen that this invention is one well adapted to attain all of the ends and objects hereinabove set forth, together with other advantages which are obvious and which are inherent to the apparatus.

It will be understood that certain features and subcombinations are of utility and may be employed with reference to other features and subcombinations. This is contemplated by and is within the scope of the claims.

As many possible embodiments may be made of the invention without departing from the scope thereof, it is to be understood that all matter herein set forth or shown in the accompanying drawing is to be interpreted as illustrative and not in a limiting sense.

What is claimed is:

1. Method of forming an encapsulated uranium oilfield tubular member, comprising the steps of:
    assembling concentric spaced tubes and closing one end of said tubes to form a tubular shell having an open end along the longitudinal axis thereof;
    filling said tubular shell with discrete bodies of uranium and lead;
    positioning said tubular shell such that said closed end is below said open end;
    forming a heating zone around a portion of the length of said shell adjacent said closed end, the temperature within said zone being above the melting temperature of lead, thereby to melt the lead within said heating zone;
    moving said heating zone axially along said shell toward said open end at a rate sufficient to maintain a substantially continuous area of transition between the melted lead within said moving heating zone and the cooling solidified lead below said zone;
    and connecting a threaded connector member to each end of the shell.

2. Method of forming an oilfield tubular member, which comprises the steps of:
    assembling concentric inner and outer tubes;
    forming a closure adjacent one end of said assembled tubes between said inner and out tubes to form an annular shell having axially spaced apart open and closed ends;

filling said annular shell with discrete bodies comprising depleted uranium and discrete bodies comprising lead;

orienting said annular shell such that said closed end is lower than said open end;

forming a heating zone around a portion of said annular shell adjacent the lower end of the shell, the temperature of the heating zone being higher than the melting point of said bodies comprising lead, thereby to melt the bodies comprising lead within the heating zone;

and moving the heating zone axially along said shell toward the upper end of the shell at a rate sufficient to maintain a substantially continuous area of transition between the melted lead within the moving heating zone and the cooling solidified lead below the zone.

* * * * *